S. K. DENNIS.
DRAFT EQUALIZER.
APPLICATION FILED MAR. 20, 1916.

1,288,530.

Patented Dec. 24, 1918.
2 SHEETS—SHEET 1.

Inventor:
Samuel K. Dennis,
By Chas. E. Lord
Atty

S. K. DENNIS.
DRAFT EQUALIZER.
APPLICATION FILED MAR. 20, 1916.
1,288,530.
Patented Dec. 24, 1918.
2 SHEETS—SHEET 2.
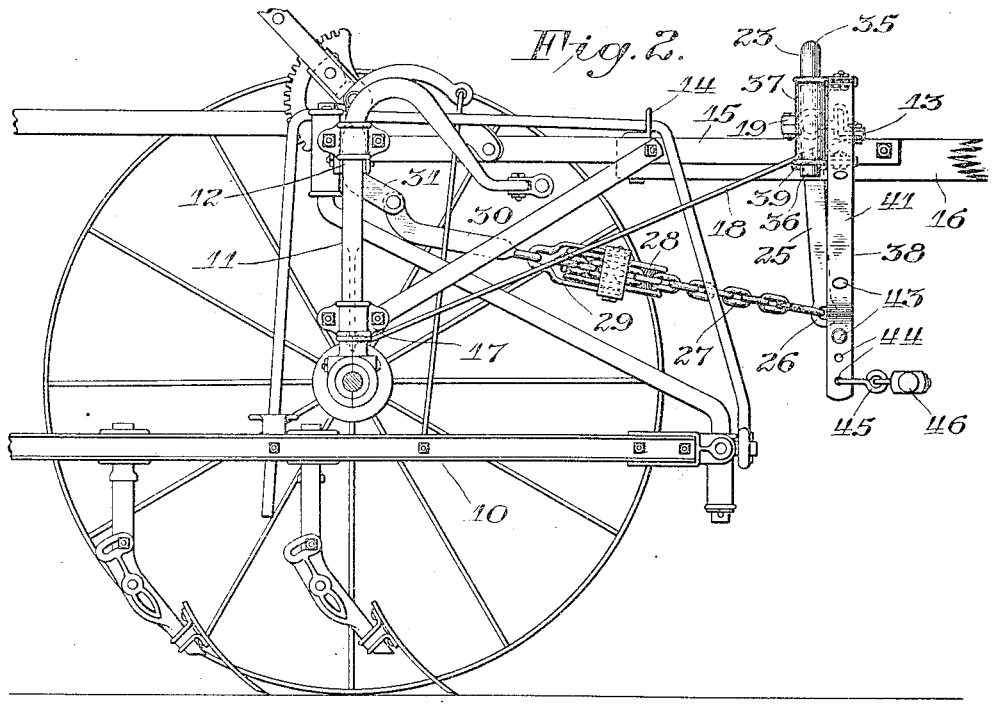
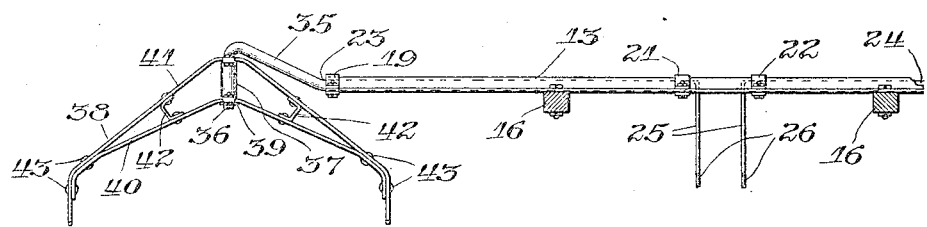
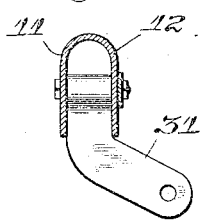
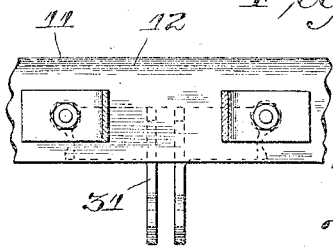
Inventor.
Samuel K. Dennis,
By
Atty.

UNITED STATES PATENT OFFICE.

SAMUEL K. DENNIS, OF CHICAGO, ILLINOIS, ASSIGNOR, BY MESNE ASSIGNMENTS, TO INTERNATIONAL HARVESTER COMPANY, A CORPORATION OF NEW JERSEY.

DRAFT-EQUALIZER.

1,288,530. Specification of Letters Patent. Patented Dec. 24, 1918.

Application filed March 20, 1916. Serial No. 85,356.

*To all whom it may concern:*

Be it known that I, SAMUEL K. DENNIS, a citizen of the United States, residing at Chicago, in the county of Cook and State of Illinois, have invented certain new and useful Improvements in Draft-Equalizers, of which the following is a full, clear, and exact specification.

This invention relates to draft equalizers, and more particularly to a four-horse draft equalizer.

I have chosen to disclose my invention in connection with cultivators because of its perfect adaptability thereto. However, it is to be understood that the draft equalizer is not limited to such use. Referring, for the moment, to the drawing of a cultivator, it is well established that the draft connection must be sufficiently low to make a straight line pull, or substantially so, from the shoulder of the horse through the draft connection to the middle shovel on the shovel gang. If the draft connection varies to either side, the best results cannot be accomplished. Ordinarily this draft connection comes not a great distance from the ground. The relatively low draft connection, however, must be arranged to avoid coming in contact with the plants around which the ground is being treated.

The main object, therefore, of my invention is to simplify and improve draft equalizers in a manner such that the draft connection may be properly located to obtain the most efficient drawing results and at the same time to avoid harming plants being cultivated where the draft equalizer is used in connection with a cultivator.

Another object of my invention is to provide a simple, compact, durable and inexpensive draft equalizer that meets all the requirements of successful commercial operation.

My invention is illustrated on the accompanying sheets of drawings, in which—

Fig. 2 is a fragmentary side elevation of the same;

Fig. 3 is a partial front elevation of the equalizer;

Fig. 4 is a detail view showing the supporting means for the draft equalizers;

Fig. 5 is a side elevation of the same, the main bar of the cultivator being shown in section.

Figure 1:
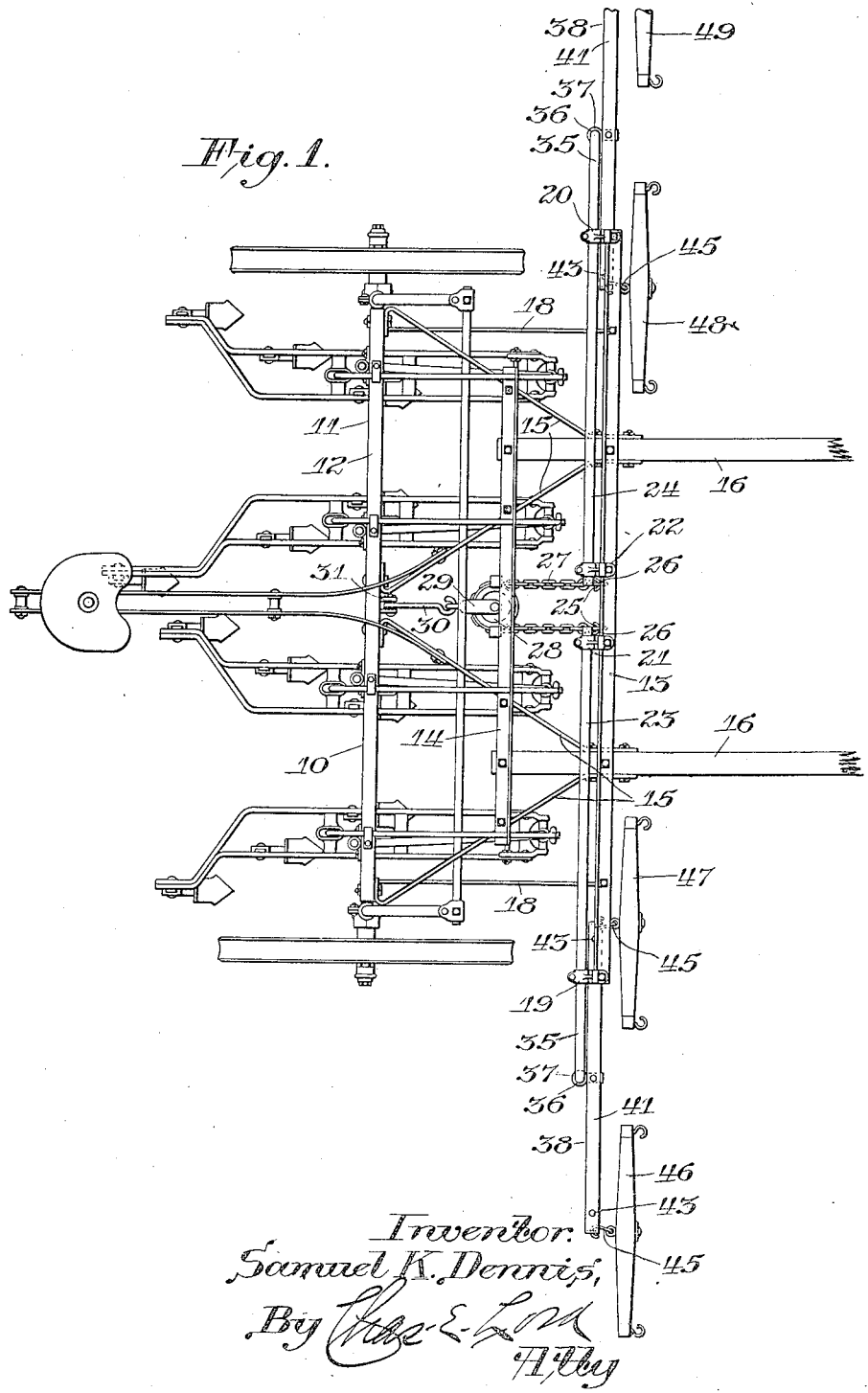
Figure 1 is a top plan view of a two-row cultivator equipped with my improved draft equalizer.

The various novel features of my invention will be apparent from the following description and drawings and will be particularly set forth in the appended claims.

My improved draft equalizer, which in this case is a four-horse draft equalizer, may be used for general purposes, but I have chosen to show the same in connection with a two-row cultivator 10 having a wheeled frame 11, including a rear transversely disposed member 12, a front frame member 13, and an intermediate frame member 14, all arranged in parallel, the members 12 and 14 being connected by suitable forwardly converging brace members 15, which are connected to draft tongues 16. These draft tongues 16 are connected to the transversely extending frame members 13 and 14. Extending between brackets 17 secured to the frame member 12 and the forward transversely extending frame member 13, are brace rods 18.

Clamped to the outer ends of the transversely extending frame member 13 are bearing members 19 and 20, and near the middle of said frame member 13 are clamped two other bearing members 21 and 22. Journaled in the bearing members 19 and 21 is a rock shaft 23, and journaled in the bearing members 20 and 22 is an adjacent rock shaft 24. These rock shafts 23 and 24 at their inner ends have depending arms 25, the lower ends of which terminate in eye portions 26 which are engaged by hooks of a flexible member or chain 27, which passes around a sheave 28 having a suitable bail 29 which is engaged by the hooked end of a link 30, which is pivotally mounted in one end of a bracket 31 secured to a support or main frame member 12 of the cultivator. The outer ends of the alined adjacently-arranged rock shafts 23 and 24 have upwardly and outwardly extending portions 35 which terminate in downwardly extending journal portions 36, which are received by bearing members 37 of eveners 38. These eveners are held in place on the portions 36 against downward displacement by cotter pins 39. These eveners 38, in addition to including the bearing members 37, include bars 40 and 41 and which are spaced for a portion of their length by spacers 42, which are secured together near their ends by rivets 43, the bar 41 continuing downward and having apertures 44 for the reception of hook members 45, by means of which swingletrees 46, 47, 48 and 49 may be selectively connected at different heights. It will be noted that the draft eveners are arched; that is, are high in the middle, to permit the eveners to pass over a row of plants without coming in contact with them. At the same time the depending apertured portions of the eveners extend sufficiently low to permit of a draft connection, which is at the proper height, to effect an efficient drawing of the implement.

By means of this arrangement two horses pull through the rock shaft 23 and two pull through the rock shaft 24. If the drawing effort exerted by two horses on one side is greater tha nthat of the two horses on the other side, the same will be equalized through the chain 27 operating on the periphery of the sheave 28. This arrangement not only results in efficient equalizing, but an efficient straight line draft is accomplished without injury to the plants around which ground is being worked where a cultivator is being drawn.

It is evident that there may be various modifications of the invention herein particularly shown and described, and it is my intention to cover all such modifications which do not involve a departure from the spirit and scope of my invention as set forth in the following claims:

What I claim as my invention, and desire to secure by Letters Patent, is:

1. A draft equalizer comprising, in combination, a plurality of rock shafts, a sheave, a flexible member passing around said sheave and connecting adjacent ends of said rock shafts, the outer ends of said rock shafts terminating in downwardly extending portions, and draft eveners journaled thereon.

2. A draft equalizer comprising, in combination, a plurality of rock shafts, a sheave, a flexible member passing around said sheave and connecting adjacent ends of said rock shafts, the outer ends of said rock shafts terminating in downwardly extending portions, draft eveners thereon having depending apertured portions, and swingletrees selectively connected to said depending apertured portions.

3. A draft equalizer comprising, in combination, a plurality of rock shafts the outer ends of which form vertical pivots, a flexible connection between the inner ends, and arched eveners mounted on the vertical pivots.

4. In a draft device, a horizontal rock shaft terminating in a vertical pivot portion, and an evener pivotally mounted on said vertical pivot portion.

5. A draft equalizer comprising, in combination, a plurality of rock shafts, a sheave, a flexible member passing around said sheave and connecting adjacent ends to said rock shafts, the outer ends of said rock shafts terminating in downwardly extending integral pivots, and draft eveners journaled thereon.

6. A draft equalizer comprising, in combination, a plurality of rock shafts, a sheave, a flexible member passing around said sheave and connecting adjacent ends of said rock shafts, the outer ends of said rock shafts terminating in downwardy extending pivots, and draft eveners journaled thereon, the center line of said pivots intersecting the center line of the rock shaft at right angles.

7. A draft equalizer comprising, in combination, a plurality of rock shafts, a sheave, a flexible member passing around said sheave and connecting adjacent ends of said rock shafts, the outer ends of said rock shafts terminating in downwardly extending integral pivots, and draft eveners journaled thereon, the center line of said pivots intersecting the center line of the rock shaft at right angles.

In testimony whereof I affix my signature.

SAMUEL K. DENNIS.

Copies of this patent may be obtained for five cents each, by addressing the "Commissioner of Patents, Washington, D. C."